United States Patent
Malik et al.

(10) Patent No.: US 11,107,080 B2
(45) Date of Patent: Aug. 31, 2021

(54) PASSWORDLESS AUTHENTICATION THROUGH USE OF DEVICE TOKENS OR WEB BROWSER COOKIES

(71) Applicant: PAYPAL, INC., San Jose, CA (US)

(72) Inventors: Omer Malik, San Jose, CA (US); Jeff Harrell, San Jose, CA (US); Desmond Chan, San Jose, CA (US); Stephen Westhafer, San Jose, CA (US); John Malhinha, San Jose, CA (US); Melanie Kriese, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 433 days.

(21) Appl. No.: 15/619,351

(22) Filed: Jun. 9, 2017

(65) Prior Publication Data

US 2017/0357976 A1 Dec. 14, 2017

Related U.S. Application Data

(60) Provisional application No. 62/348,777, filed on Jun. 10, 2016.

(51) Int. Cl.
*G06Q 20/40* (2012.01)
*H04L 29/06* (2006.01)
*G06Q 20/12* (2012.01)

(52) U.S. Cl.
CPC ......... *G06Q 20/4014* (2013.01); *G06Q 20/12* (2013.01); *H04L 63/0807* (2013.01)

(58) Field of Classification Search
CPC ............................................ G06Q 20/00–425
See application file for complete search history.

(56) References Cited

U.S. PATENT DOCUMENTS

| | | | |
|---|---|---|---|
| 6,047,268 A * | 4/2000 | Bartoli | G06Q 20/02 |
| | | | 705/35 |
| 6,684,248 B1 * | 1/2004 | Janacek | H04L 63/12 |
| | | | 709/217 |
| 2008/0028446 A1 * | 1/2008 | Burgoyne | H04L 63/0428 |
| | | | 726/6 |

(Continued)

OTHER PUBLICATIONS

Ron White, How Computers Work, 7th Edition (Year: 2003).*

*Primary Examiner* — John W Hayes
*Assistant Examiner* — Taylor S Rak
(74) *Attorney, Agent, or Firm* — Haynes and Boone, LLP

(57) ABSTRACT

There is provided systems and methods for passwordless authentication through use of device tokens or web browser cookies. A user may enter into a checkout process with a merchant for a transaction requiring electronic transaction processing with a service provider. The checkout process may be performed prior to or without the user having previously established an account with the service provider for electronic transaction processing. The user may therefore provide user information, such as a name and financial information, and an account for the user may be established. To establish the account, the user is not required to enter a password, and the password is automatically set by the service provider. The service provider may then establish a token on the user's device during transaction processing that later authenticates the device for use of the account during future transaction processing when the token is received.

20 Claims, 6 Drawing Sheets

(56) References Cited

U.S. PATENT DOCUMENTS

| | | | | |
|---|---|---|---|---|
| 2011/0302630 A1* | 12/2011 | Nair | .................. | H04L 63/083 |
| | | | | 726/4 |
| 2012/0317028 A1* | 12/2012 | Ansari | ............... | G06Q 20/0655 |
| | | | | 705/44 |
| 2015/0371221 A1* | 12/2015 | Wardman | ........... | G06Q 20/3674 |
| | | | | 705/67 |
| 2016/0292682 A1* | 10/2016 | Purves | ................ | G06Q 20/405 |

* cited by examiner

Guest Checkout 1000 🛒 $48.85 ⌄

We don't share your financial details with the merchant.

[United States ⌄]

[VISA] [Card number]

Expires    CSC
[MM / YY ⌄]  [3 - 4 digits]

[First name]

[Last name]

Billing Address

[Street address]

[Apt..ste..bldg..etc. (optional)]

[City]

[State ⌄]  [ZIP]

☑ Ship to my billing address

Contact Information

[Mobile ⌄] [Phone number]

[Email (for receipt)] ⓘ

1002

New User Checkout 1004 🗔

Save your payment info for faster checkout on this device
1006

☐ Save my payment info and create a PayPal account
1008

Back    [ Pay Now ]
1010

200a

User Opt-In 1012 🗔

Save your payment info for faster checkout on this device
1006

☑ Save my payment info and create a PayPal account
1014

Back    [ Agree & Pay Now ]
1016

PASSWORDLESS AUTHENTICATION THROUGH USE OF DEVICE TOKENS OR WEB BROWSER COOKIES

CROSS REFERENCE TO RELATED APPLICATIONS

The present application claims priority to U.S. Provisional Pat. Application Ser. No. 62/348,777, filed Jun. 10, 2016, which is incorporated by reference in its entirety.

TECHNICAL FIELD

The present application generally relates to account authentication through stored data, and more specifically to passwordless authentication through use of device tokens or web browser cookies.

BACKGROUND

Users may utilize an online service provider during transaction processing that provides transaction processing services, account management, account security and fraud prevention, and other features to users. The online service provider may further be integrated with merchants, so that the service provider's transaction processing services may be utilized to process and complete a transaction between the merchants and users. For example, in a checkout portal or interface of a merchant's website or dedicated application, a user shopping with the merchant may be provided with an option to complete checkout and process a transaction using the online service provider for transaction processing with the merchant. The user may not have an account with the service provider, and thus the service provider may allow the user to perform a one-time payment through the service provider, which is often referred to as a "guest" checkout and may utilize an payment instrument of the user. However, this requires the user to enter the user's information for each transaction, which may take a substantial amount of time and does not give the user benefits provided by having an account with the service provider, including authentication processes and account protections. Moreover, even if the user has an account with the service provider, the user may be required to enter a password or other account authentication, which the user may not recall, and thus the user may be required to go through a lengthy password reset process or other process to retrieve account credentials.

BRIEF DESCRIPTION OF THE DRAWINGS

FIG. 2A are exemplary interfaces of a checkout process to establish a passwordless account and use the account during checkout, according to an embodiment;

Figure 1:
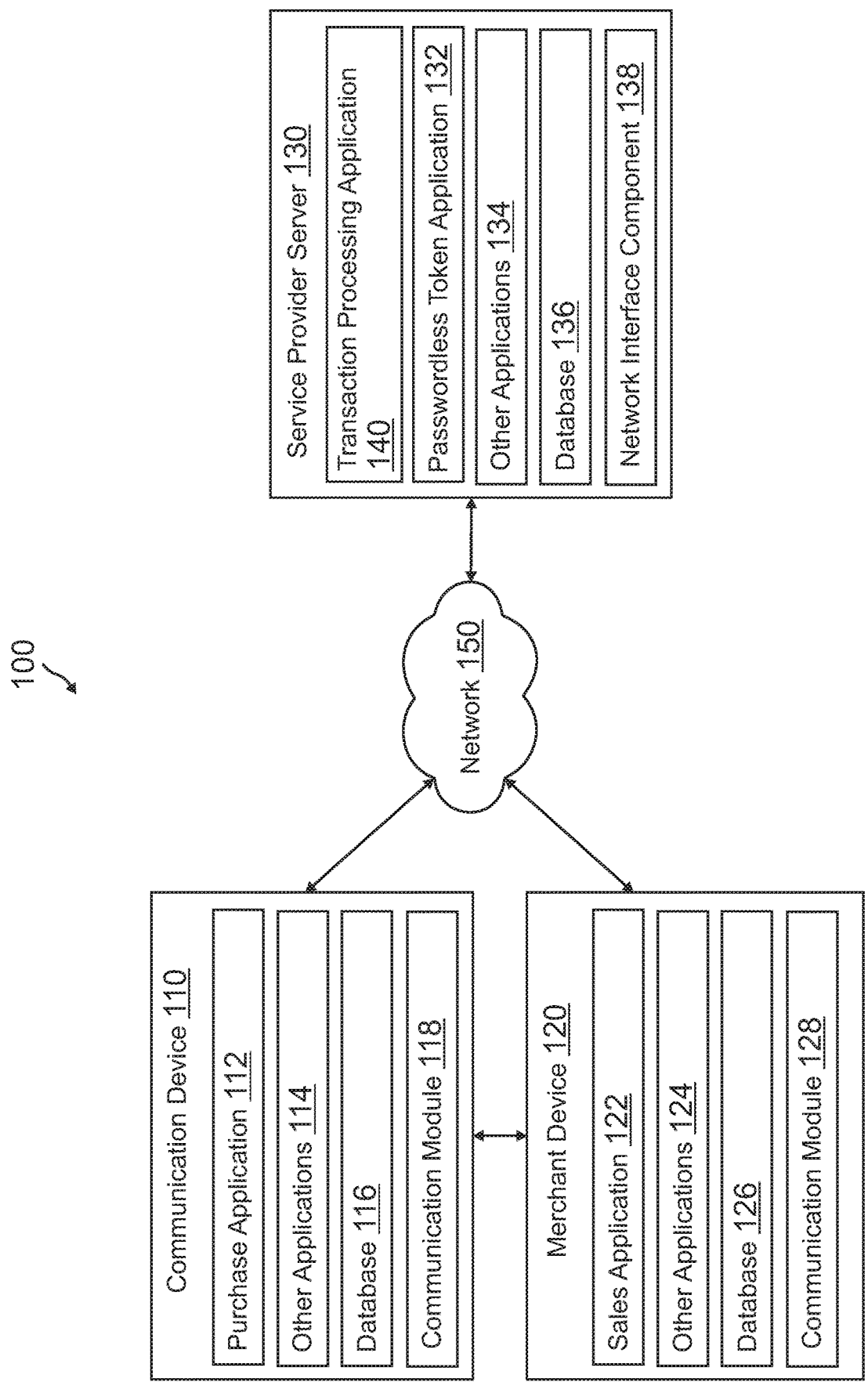
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for passwordless authentication through use of device tokens or web browser cookies. Systems suitable for practicing methods of the present disclosure are also provided.

A service provider, such as PayPal® or other online payment provider or transaction processor service, may provide payments and other services on behalf of users, merchants, and other entities. The payment provider may provide payment accounts and/or payment processes to users that allow users to send and/or receive payments between the user and another user/merchant. For example, a user may wish to provide a payment for a transaction with a user/merchant, transfer money to another family/friend, engage in a transaction previously generated and provided to the user, initiate a transaction with another entity, or perform another process. A merchant may similarly send and/or receive payments between the merchant and another user/merchant, which may include receiving payment for transactions, providing payments to employees and/or for business expenses, transfer money between accounts, or perform further transaction processing. Other entities, such as charitable organizations and businesses, may also utilize the payment provider, for example, to receive donations from various parties and/or pay business expenses. The online payment provider may be utilized to perform such transaction processing. Additionally, the online payment provider may provide payment accounts and digital wallet services, which may offer account services to send, store, and receive money, process financial instruments, and/or provide transaction histories. The online payment provider may offer further services, such as extension of credit, credit history review, account establishment and maintenance, and other financial and personal services.

Merchants may sell items (which can include physical goods, digital goods, and/or services) to buyers through an online marketplace, which may be accessible through a web browser of the user (e.g., a merchant website and/or a website of another online service provider offering the online marketplace) or a dedicated application for the merchant. A user may select one or more items for purchase, for example, by entering the items into a transaction or shopping cart for the merchant's marketplace (e.g., through selection of the items for purchase with the merchant) using a device of the user to access the merchant's marketplace. The online payment provider may provide payment services including payment accounts for use during transaction processing to provide a payment. Thus, the user may engage in a transaction with the merchant, where the online payment provider corresponds to the payment mechanism during transaction processing. If the user has a payment account with the payment provider, the user may enter payment account information during checkout and transaction processing to use the payment instrument for the transaction.

Thus, the payment provider may provide payment to the merchant/seller for the transaction, where the buyer is billed the amount for the payment (and any additional fees, for example, fees required for the transaction and/or using the user's payment account as a payment instrument for the payment) to the payment account of the user. The payment account may be linked to a financial instrument, such as a debit/credit card, bank account, or other financial source. Thus, the payment provider may process the financial instrument of the user to provide payment to the merchant, for example, by withdrawing funds from a bank account or processing a debit/credit card to provide the payment to the merchant. The user may be required to authenticate usage of the payment account during transaction processing and payment, for example, by providing authentication credentials, such as an email, username, password, PIN, and/or performing a two or more step authentication. In other embodiments, the service provider may authenticate the transaction based on the originating device (e.g., a token or cookie stored to the user device, for example, after an initial login and authentication by the user with the payment account). Moreover, a merchant may also provide sales through a physical merchant location, such as a brick and mortar store, where the merchant provides transaction processing through the online payment provider. Thus, similar payment processing may be done by the user through the user's device at a physical merchant location, where the user's device may interface with a merchant device at the merchant's physical location in order to perform transaction processing and payment services through the online payment provider.

The payment provider may further provide a digital wallet to the user through the payment account, where the digital wallet may include one or more financial instruments that the user may use during transaction processing. Thus, the payment provider may further include additional transaction management services, as well as account services for use with the payment provider and accessible through a device application, such as a browser application, dedicated application of the payment provider, and/or other application (e.g., merchant application) utilizing the processes and features provided by the payment provider. However, in other embodiments, transaction processing services using the online payment provider may be integrated into the merchant's website/dedicated application. Accounts with the payment provider may correspond to a digital wallet, as well as a payment account, where a holder of the account may send and receive payments and engage in transaction processing. For example, payment accounts with a payment provider may allow the user to send and receive money for transactions, transfers, and other financial actions. The accounts of users may include personal, device, and financial information, as well as other information that may be determined by or requested from the payment provider. Additionally, the user may specify authentication credentials, such as a login name, password, and/or personal identification number (PIN) for use of the account.

However, in other embodiments, the user may not have a payment account with the payment provider. The user may not wish to go through the process of establishing a payment account with the payment provider. For example, the user may be prone to forgetting a password or other authentication credentials, and thus, may not want to generate an account where the authentication credentials may be lost or forgotten and the user is required to remember authentication credentials, Such a checkout process using the payment provider may be termed a "guest checkout" or other checkout process without requiring a user account for the user to utilize the payment provider. Instead, the user may perform the guest checkout to complete a transaction using the payment provider for transaction processing without becoming a member of the payment provider or otherwise generating an account with the payment provider. Thus, when checking out for a transaction with the merchant using the online payment provider, the user may provide user information and payment information necessary to effectuate a payment to the merchant. The provided information may be utilized to establish a payment account for the user, where the payment account is generated by storing the provided information to the payment account. For example, an email address, first/last name, shipping address, or other information may be used to generate a username or login credential. In other embodiments, the payment provider may request the user enter a user name, or may set the user name as the user's email or other provided identifier. In certain embodiments, the user name may also be automatically generated, for example, randomized and/or determined using the provided information.

During the guest checkout, the merchant may provide an interface for the user to enter the provided information, or the payment provider may provide the interface through a website or dedicated application, where the interface includes one or more fields for entry of the information required for the guest checkout and transaction processing of the transaction. The payment provider may also establish a secure channel between the user's device and the payment provider for receipt of the requested information, or the channel may be established between the payment provider and the merchant when the merchant provides the user information entered to the interface during the guest checkout with transaction information and/or merchant information necessary to process the transaction by the payment provider. The interface may include an option to perform a guest checkout so that the user does not enter into an account generation process. The interface may include a selectable option, field, or box to enter into "one-touch" checkout where the account for the user is automatically generated, and the user may perform future transaction processing using the account. The process may be referred to a "one-touch" by generating a data token, cookie, or other data stored to the user's device that may authenticate the user for use of the automatically generated account and not be required to provide the user information for transaction processing using the user's device during future checkouts and electronic transaction processing with the payment provider. Additionally, the user may further be provided an option in the interface to elect not to generate an account and only perform a single transaction processing through the guest checkout option, and thus the payment provider may not perform the processes described herein to automatically generate a password or other authentication credentials and allow for one-touch transaction processing in future transactions using the account.

In order to generate authentication credentials, such as a password or other secret provided with a username, for the account that is automatically generated and provides one-touch checkout during future transaction processing with the payment provider, the payment provider may automatically generate a password, or may set a null password (e.g., no password or assigning null (e.g., a null value or character) to the password field required for the account authentication credentials). Where a null password is set, the password field may be empty, and authentication to use the account may be set so that the authentication credential is required to be a token or cookie stored to a device. Thus, where a null (or random/automatically generated) password is established, account settings and/or required authentication for the account may only correspond to receiving a token or cookie generated for the account, as described here. The password may be randomized when automatically generated, or otherwise generated using a difficult to guess/determine password through brute force (e.g., repeatedly guessing the password during a fraudulent account access attempt). The password may be randomized using the user information, for example, by assigning parts of the user information to the password or utilizing an algorithm to convert parts of the user information to the password. Once authentication credentials for the account are established, the payment account may be automatically generated, and the user may provide a payment to the merchant for the transaction through the payment account (e.g., using a payment instrument stored to a digital wallet of the payment account, such as the payment instrument provided by the user) when checking out with the merchant through the payment provider without being required to establish account credentials for the account.

In order to provide expedited checkout in the future with the merchant and/or other merchants using the user's device on which the account was created, the payment provider may establish a device token or cookie (e.g., an HTTP cookie or other data piece stored to the device). The device token or cookie may correspond to an authentication token or cookie, where the authentication token or cookie includes encrypted data for the user's automatically generated payment account that authenticates the user for use of the payment account during transaction processing. The encrypted information may correspond to authentication credentials, or may include data needed by the payment provider to identify the account and authenticate the user for use of the account through the stored data, so that when the token/cookie is provided to the payment provider by the device during future transaction processing, the user would not be required to enter user information. The token or cookie may be provided during future electronic transaction processing by the device, which may be used by the payment provider to authenticate the user for the automatically generated payment account and allow the user to perform transaction processing using the automatically generated payment account. Thus, the user may be provided with one-touch transaction processing by using the token to enter a checkout process and automatically recall and use the user's information previously entered during the initial transaction processing.

The token or cookie may be communicated to the user's device or otherwise established on the user's device by the payment provider. The token or cookie may be transmitted to the user's device during the first checkout and/or when the account is generated using the automatically set password. For example, the token or cookie may be communicated to the user's device over a secure communication channel between the user's device and the payment provider. The communication channel between the payment provider and the user's device and/or the merchant's device/server requesting transaction processing may be encrypted or otherwise secured, such as a secure TCP/IP communication channel between endpoints. This secure channel may be established when the payment provider receives the provided information, processes the first transaction based on the provided information discussed above and transaction information for the purchased items, and/or when generating the account automatically using the null or random set password. Thus, the secure channel may be used to transmit the token or cookie to the user device securely, where the token or cookie may then be stored to the device for later use.

When the user later visits the same or a different merchant using the user's device (e.g., visits a merchant website for the same of different merchant, uses a merchant application for the same or different merchant, or performs a transaction with the same or different physical merchant using the user's device), the user's device may automatically and securely communicate the token or cookie to the payment provider during transaction processing, where the token or cookie authenticates the user with the payment provider. The checkout interface during the future electronic transaction processing may therefore not require the user to re-enter user information, and instead the token or cookie may be used to recall the account and stored user information for the account so that the user is only required to request to process the transaction, or select a single (one-touch) option to engage in transaction processing. Thus, the user is not required to recall a username and/or password for the account, and electronic transaction processing may be accomplished by just providing the token/cookie with the transaction information to process the transaction. The one-touch checkout process where the user is not required to enter user credentials may be established for the payment provider across all or some other merchants, so that the user may utilize one-touch checkout using passwordless authentication for the account with different merchants, thereby providing one-touch checkout across multiple merchants. One-touch checkout may therefore be available without providing user information in a guest checkout screen or establishing an account when arriving at a checkout process in a checkout interface of the payment provider, which may be for the same merchant/website/application, or for a different merchant/website/application. For example, the checkout process provided by the payment provider across multiple different merchant platforms may identify the user's device through provided information during a browsing/shopping session and/or at the checkout, and an option to use the one-touch checkout may be provided. The option may allow the user utilize the previously established account to complete the current transaction with the merchant using the payment provider. The token or cookie may be encrypted or otherwise sent through a secure connection to payment provider during transaction processing. The automatically generated and/or null password may be encrypted in the cookie during use of the token or cookie, and thus, may be robust in that the password may not be faked or stolen.

However, in other embodiments, the token or cookie may have other data that is encrypted and allows for authentication of the user for use of the account, such as encrypted token data that may be used to identify the user's account and authenticate the user/device for use of the account. For example, the token may include device-specific information, including a system identifier, device or operating system parameter, application identifier, or other data that may be used by the payment provider to identify the device. Using the data from the token, the payment provider may therefore identify the user's device, and authenticate the device for use of the account through a determination that the device is the device used to establish the passwordless authentication for the account and opt-in to the one-touch checkout process. The token may further include a hash value used to identify the device and/or determine the device and associated account using a hash function for the payment provider. In some examples, the hash value may be created based on and/or using device identification information such that the server may be able to recreate the hash value upon receiving device information from a user device, which may be part of the authentication process. A token may include other data necessary for the payment provider to identify the device and/or authenticate the device for use of the account.

In order to provide fast payment processing and checkout for the user in the future, the token or cookie may be provided to the payment provider during checkout so that the user may immediately provide a payment to a merchant using the payment provider without re-entering user information and/or financial information. Advantageously, the user is not required to re-enter into a checkout process that includes multiple interfaces and/or fields for data entry. Since the token or cookie is stored to the user's device, the user is not required to actively enter information during checkout with the same merchant or a new different merchant. The user may request the device send the token or cookie during transaction processing, or the device may automatically send the token or cookie, for example, on request by the payment provider during transaction processing or automatic transmission by the device's web browser and/or other application. Once received by the payment provider, the payment provider may then perform transaction processing. Thus, the user may utilize a simplified checkout experience and process through the same merchant or different merchants using the token or cookie, for example, through selection of a menu option in a checkout interface, entry of an authentication credential known for the user for the device, and/or entry of a biometric (e.g., scanning a fingerprint of the user to ensure that the user of the device is authorized to use the device and/or the token/cookie). The token may be refreshed during further payment processing so that the token maintains validity on the user's device. In this regard, the user may utilize the capabilities of the payment provider's account services while not having to remember account authentication credentials and/or establish those account credentials.

The token may therefore be device-specific and/or browser-specific so that the token is not established on other devices for the user to utilize the account with other devices. For example, the token is stored to the user's device used to opt-in to the one-touch service using an account having passwordless authentication. The token is therefore established on the single user device, and other devices are not able to utilize the account during a checkout process as the other devices do not have the token necessary to authenticate the device for use of the account. Moreover, since the password (and username, in certain embodiments), is randomly generated, null, or otherwise unknown to the user, the user cannot provide authentication credentials for access to the account. Thus, the user may not access the account through a website or application of the payment provider without first establishing authentication credentials and requesting establishment of the credentials to allow account login and access. The account may therefore only be used to one-touch transaction processing using passwordless authentication through the token/cookie on the particular device, and not for other transaction processing and/or account use.

Because the token is stored to a single device and device-specific, if the user utilizes another device for transaction processing, the user may not have access to the user's payment account. For example, as the user has not provided authentication credentials (i.e., a random or null password was generated), the user may not know the authentication credentials to access the account. Thus, when using a new device, during checkout and/or payment at a merchant website/application and/or through the payment provider, the user may need to re-enter all or part of the user information and/or financial information required during checkout and payment for a transaction. In certain embodiments, only a portion of the user information may be required in order to authenticate the user, such as financial/payment information, a phone number allowing for contact of a security code for transmission back to the payment provider, etc. The information may be received by the payment provider, and may be used to identify the user and the user's payment account. The information may further be used to authenticate that the user is who the user says they are, for example, by requiring information likely to only be known by the user and/or used by the user, such as a shipping address, financial account information, or other user/financial information. The payment provider may then issue another token to the user's new device or establish another cookie on the user's new device. An email may be sent to an identified email address and account of the user of the new token generation for the second or further device to prevent fraud. The email may also include an option or process to allow the user to access the payment provider and account, and establish a known and set password for the user's account if the user wishes to create authentication credentials for the account that are known to the user.

Prior to establishing account authentication credentials (e.g., a username and/or password for the account), the one-touch log in process having passwordless authentication using the token/cookie may be the only account authentication process available to the user and the user's device. The user may not be able to access the account through traditional login by supplying a username and password to access the account, and instead may only utilize the account through the passwordless authentication using the token/cookie. For example, at least the password may be unknown to the user, as well as the username in some embodiments where the username is generated (e.g., randomly or using user information) by the payment provider, and thus the user cannot login to their account using authentication credentials in a login interface provided by the payment provider. To receive authentication credentials allowing login, as well as use the other services of the payment provider, the user may wish to establish a username and/or password for the account, which may be performed through accessing the payment provider and providing user information and/or the token/cookie necessary to determine the account for the user and authenticate the user. The user may also perform password set or reset process, where the user may enter a known user name, user information, and/or financial information, and go through a password recovery process. The password establishment/password recovery process may utilize the provided information, as well as user queries, to authenticate that the user is who the user says they are and allow the user to set or reset a password for the account or establish a new password. Once completed, the user may utilize the password to login to the account during checkout and payment or use the payment provider on the new device, which may cause the payment provider to establish a new token or cookie on the new device for expedited login in future transactions. Thus, although the account may be "passwordless" in the sense that the user has not entered and established a password during initial use of the account (i.e., instead a random or null password was established for the account), the user may be given the option to later establish a password for the account.

Additionally, although some locations, jurisdictions, countries, or other areas may require limited user information and/or financial information during transaction processing when the user creates an account, additional user information may also be required in certain countries and/or by the payment provider in order to increase security when checking out as a "guest" or unregistered user of the payment provider. For example, a driver license number, passport number, or other consumer specific information may be required during the guest checkout process. The additional consumer-specific information may then be used for account creation, where the account is required to be generated using the additional information and the additional information allows for account setup and creation. The additional consumer-specific information may also be leveraged with the account to provide increased authentication by requiring the consumer-specific information to be provided when the user utilizes a new device to perform transaction processing using the payment provider. Thus, the user may provide the consumer specific information to authenticate the user and cause generation of a token/cookie that allows the user to perform expedited and simplified checkout with merchants.

Once the token or cookie is received, the payment provider may approve or decline the transaction using transaction processing services provided by the payment provider, including backend processing of credit/debit card information, bank account withdrawals, and other payment/transaction processing services. If the payment provider approves the transaction, the payment provider may provide a payment to the merchant through the user's payment instrument in the automatically generated payment account, as well as request a fee payment from the user and/or merchant, which may be added to or deducted from the transaction. However, the payment provider may also reject the transaction, for example, if fraud is detected or the user's payment instrument is invalid or insufficient to cover the cost of the transaction. If the payment provider declines payment, the user may not be billed and the merchant may not be paid using the payment instrument of the buyer. The user may be provided with an option to proffer additional information that may reduce the risk, such as identity and/or account authentication information, dual or multiple factor authentication through a device or additional authentication channel, another payment instrument, or other information necessary to complete the transaction.

The authentication token or cookie provided to the user's device may differ from tokens utilized during transaction processing, such as payment tokens that may be utilized to secure payment information and data for a payment instrument. For example, tokens may also be generated for the user's digital wallet that is provided with a normal or full-access account established with the service provider using known authentication credentials that the user has set and entered for the account. The wallet token may be used to secure digital wallet data by substituting sensitive data (e.g., payment card information, authentication information or credentials, etc.) for another value or identifier that may map back to the sensitive data element through a tokenization process and system of the service provider. Similarly, during transaction processing, a payment token may be utilized for payment card information for a payment card (e.g., debit/credit card) or other sensitive payment information, where the payment token may be utilized in place of the sensitive information during transmission and allow the service provider or other backend payment processor to determine the payment information on receipt. Thus, the authentication token provided to a user's device for passwordless authentication may only provide services associated with authentication of the user's device during a checkout process and/or for use of the account, and is not used during processing of a payment instrument between one or more entity devices.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a communication device 110, a merchant device 120, and a service provider server 130, in communication over a network 150. A user (not shown) may utilize communication device 110 to engage in a transaction with a merchant (not shown) through merchant device 120. The user may select items for purchase and enter a checkout process with the merchant. The checkout process may allow for transaction processing using service provider server 130, including transaction processing as a guest user not registered with service provider server 130. Service provider server 130 may receive user and/or financial information for the user, which may be used to automatically generate an account with account credentials. The service provider may then generate a token or cookie for storage on communication device 110, where the token or cookie is later used for account authentication using the automatically generated account with service provider server 130. Service provider server 130 may also provide a digital wallet to the user, where the user may utilize the digital wallet during payment processing. Thus, service provider server 130 may further provide transaction processing to the user using communication device 110.

Communication device 110, merchant device 120, and service provider server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Communication device 110 may be implemented as a communication device that may utilize appropriate hardware and software configured for wired and/or wireless communication with merchant device 120 and/or service provider server 130. For example, in one embodiment, communication device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may be used and function similarly.

Communication device 110 of FIG. 1 contains a purchase application 112, other applications 114, a database 116, and a communication module 118. Purchase application 112 and other applications 114 may correspond to executable processes, procedures, and/or applications with associated hardware. In other embodiments, communication device 110 may include additional or different modules having specialized hardware and/or software as required.

Purchase application 112 may correspond to one or more processes to execute software modules and associated devices of communication device 110 to initiate and/or generate transactions to purchase items, as well as request transaction processing through service provider server 130. In this regard, purchase application 112 may correspond to specialized hardware and/or software utilized by a user view items for purchase from a merchant associated with merchant device 120 and select one or more items to purchase in a transaction. Once a transaction is generated, purchase application 112 may be used to request checkout and transaction processing for the transaction. In various embodiments, the merchant may provide checkout and payment processing using services provided by service provider server 130. Where the user does not have an account with service provider server 130, the merchant and/or service provider server may allow for "guest checkout" and transaction processing, where the user does not go through a process to establish an account with service provider server 130. Instead, the user may provide user information (e.g., name, shipping address, birthdate, and/or other consumer specific information) and/or financial information (e.g., a financial account, shipping address, etc.) during the checkout process. Purchase application 112 may display one or more interfaces, including a checkout interface for the checkout process. The interface may be accessible and displayed through accessing a merchant marketplace and engaging in a transaction with the merchant. Thus, the checkout interface may be displayed during electronic transaction processing and completing the checkout process. Purchase application 112 may communicate the user and/or financial information to service provider server 130 during the checkout process, where a secure communication channel (e.g., secure TCP/IP communications between communication device 110 and service provider server 130) may be established to transmit the information to service provider server 130. The secure communication channel may be established for the checkout process to transmit data entered to one or more fields of the checkout interface. Where the user does not have an automatically generated account, service provider server 130 may automatically generate an account and communicate a token to purchase application 112 or establish a cookie with purchase application 112, where purchase application 112 may store the token/cookie for future use, as discussed herein. However, if the user has an automatically generated account but purchase application 112 does not have a token/cookie (e.g., communication device 110 is different device than the device previously used by the user, the token is deleted, or device cookies are cleared), a new token may be communicated to purchase application 112 by service provider server 130 for use in future or additional transaction processing.

In various embodiments, purchase application 112 may correspond to a general browser application configured to retrieve, present, and communicate information over the Internet (e.g., utilize resources on the World Wide Web) or a private network. For example, purchase application 112 may provide a web browser, which may send and receive information over network 150, including retrieving website information, presenting the website information to the user, and/or communicating information to the website, including electronic communications and associated information. However, in other embodiments, purchase application 112 may include a dedicated application of service provider server 130 or other entity (e.g., the merchant associated with merchant device 120, payment provider, etc.), which may be configured to send and receive electronic communications and engage in electronic transaction processing. Thus, the user associated with communication device 110 may utilize purchase application 112 to engage in further transactions with the merchant/seller associated with merchant device 120. During additional transaction processing, the user may request payment for the transaction to be made using service provider server 130 during additional checkout processes, for example, when arriving at a checkout interface for another transaction. Purchase application 112 may provide the stored token or cookie for use as an authentication mechanism or credentials during transaction processing. The checkout interface may identify that communication device 110 has a stored token/cookie so that the user may be provided with a one-touch transaction processing and selection of a link or option to process the transaction using the token/cookie without requiring the user to enter user information or authentication credentials. In other embodiments, payment application 112 may retrieve the token/cookie automatically on arriving at the checkout interface or requesting transaction processing and send the token to service provider server 130 with the additional transaction (having transaction information for items to purchase from a merchant). Additionally, purchase application 112 may be utilized to establish and/or maintain the user account, payment account, digital wallet, and/or other online with service provider server 130, for example, by providing processes to access the account and/or set a known password for the account that the user enters and knows. The password establishment or reset process may be initiated through a received message, such as a text or email having a link or executable process, to access the account and enter the password. The process may also be initiated through providing some user information for the account. In other embodiments, another application, such as one or more of other applications 114, may be utilized to maintain the user account and/or digital wallet, as well as request and/or effectuate payments using the digital wallet.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 150, or other types of applications. Other applications 114 may also include additional communication applications where not provided by purchase application 112, such as email, texting, voice, and IM applications that allow a user to send and receive emails, calls, texts, and other notifications through network 150. In various embodiments, other applications 114 may include financial applications, such as banking, online payments, money transfer, or other applications, which may be utilized to maintain a user account with service provider server 130. Other applications 114 may also include other location detection applications, such as a mapping, compass, and/or GPS application, which may be used to determine a location for the user that is communicated to service provider server 130. Other applications may include social networking applications and/or merchant applications. Other applications 114 may include device interfaces and other display modules that may receive input and/or output information. For example, other applications 114 may contain software programs, executable by a processor, including a graphical user interface (GUI) configured to provide an interface to the user.

Communication device 110 may further include database 116 stored to a transitory and/or non-transitory memory of communication device 110, which may store various applications and data and be utilized during execution of various modules of communication device 110. Thus, database 116 may include, for example, IDs such as operating system registry entries, cookies associated with purchase application 112 and/or other applications 114, IDs associated with hardware of communication device 110, or other appropriate IDs, such as IDs used for payment/user/device authentication or identification. Database 116 may store information for automatic authentication of an account with passwordless authentication, such as identifiers, tokens, cookies, and/or authentication provided to communication device 110 from service provider server 130. Additionally, transaction information for a transaction between the user for communication device 110 and the seller for merchant device 120 may be stored to database 116, including a token or cookie used for account authentication in transaction processing. Database 116 may include information for a digital wallet, including available payment instruments in the digital wallet.

Communication device 110 includes at least one communication module 118 adapted to communicate with merchant device 120 and/or service provider server 130. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Merchant device 120 may be maintained, for example, by a merchant that provides electronic sales to users through communication device 110 and/or service provider server 130. In this regard, merchant device 120 may include a device having processing applications, which may be configured to interact with communication device 110 to engage in transactions. Merchant device 120 may be implemented using any appropriate hardware and software configured for wired and/or wireless communication with communication device 110 and/or communication device 130. For example, in one embodiment, merchant device 120 may be implemented as a single or networked personal computer (PC), a smart phone, laptop computer, wearable computing device, and/or other types of computing devices at a merchant location capable of transmitting and/or receiving data. Although only one merchant device is shown, a plurality of merchant devices may function similarly.

Merchant device 120 of FIG. 1 contains a sales application 122, other applications 124, a database 126, and a communication module 128. Sales application 122 and other applications 124 may correspond to processes, procedures, and/or applications executable by a hardware processor, for example, a software program. In other embodiments, merchant device 120 may include additional or different modules having specialized hardware and/or software as required.

Sales application 122 may correspond to one or more processes to execute modules and associated specialized hardware of merchant device 120 that provide sales, checkout, and payment processes for a transaction to purchase one or more items for sale from the user, such as a merchant or seller, corresponding to merchant device 120. In this regard, sales application 122 may correspond to specialized hardware and/or software of merchant device 120 to provide a convenient interface to permit a seller to enter, view, and/or edit items and/or services for purchase by the user associated with communication device 110. For example, sales application 122 may be implemented as an application enabling the seller to enter item information and request payment for a transaction on checkout/payment of one or more items/services. In certain embodiments, sales application 122 may correspond more generally to a web browser configured to view information available over the Internet or access a website corresponding to the seller and/or an online marketplace utilized by the seller. Thus, sales application 122 may provide item sales through an online marketplace using the website of the seller or another service provider. Sales application 122 may provide one or more interfaces to process a transaction, including checkout interfaces for checkout processes to provide electronic transaction processing for a transaction to purchase one or more items. The user of communication device 110 may initiate a transaction using sales application 122, for example, through accessing the merchant marketplace using purchase application 112 or providing items to the merchant to be entered into a transaction and having the transaction communicated to purchase application 112 for processing. Once a payment amount is determined for a transaction for items to be purchased by user, sales application 122 may request payment from the user for transaction processing through a checkout process, for example, one completed using one or more checkout interfaces, which may be provided by service provider server 130. Payment may be provided through a payment instrument, which may be associated with purchase application 112 and/or communication device 110. The provided payment information may be communicated to merchant device 120, which may be used with the transaction and transaction information for approval.

In further embodiments, sales application 122 may be integrated with transaction processing services offered by service provider server 130. In this regard, one or more checkout and transaction processing interfaces may provide features to perform transaction processing with service provider server 130. Thus, a checkout interface for service provider server 130 may communicate information directly between communication device 110 and service provider server 130. Such services may allow payment through a payment account of a user with service provider server 130. Additionally, the services may allow a guest checkout, where the user does not have an account with service provider server 130 and does not establish an account with service provider server 130. The guest checkout may allow the user to enter user and/or financial information. The user may then provide the information during the checkout process, where service provider server 130 may automatically generate the account, as described herein. The transaction may then be processed with the automatically generated account. Sales application 122 may then receive the results of the transaction processing, and complete the transaction with the user, for example, by providing the user the items for the transaction or declining the transaction where the user is not authenticated or the transaction is not authorized (e.g., insufficient funds, rejection of the transaction based on risk analysis by service provider server 130). Sales application 122 may receive a payment notification from service provider server 130. A transaction history may then be generated by sales application 122 and/or service provider server 130.

Merchant device 120 includes other applications 124 as may be desired in particular embodiments to provide features to merchant device 120. For example, other applications 124 may include security applications for implementing client-side security features, programmatic client applications for interfacing with appropriate application programming interfaces (APIs) over network 150, or other types of applications. Other applications 124 may also include email, texting, voice and IM applications that allow a user to send and receive emails, calls, texts, and other notifications through network 150. In various embodiments, other applications 124 may include financial applications, such as banking, online payments, money transfer, or other applications associated with communication device 130. Other applications 124 may contain software programs, executable by a processor, including a graphical user interface (GUI) configured to provide an interface to the user.

Merchant device 120 may further include database 126 which may include, for example, identifiers such as operating system registry entries, cookies associated with sales application 122 and/or other applications 124, identifiers associated with hardware of merchant device 120, or other appropriate identifiers, such as identifiers used for payment/user/device authentication or identification. Identifiers in database 126 may be used by a payment/credit provider to associate merchant device 120 with a particular account maintained by the payment/credit provider. Database 126 may further include transaction information and/or results, including received payment instruments and/or user/seller information. Database 126 may also store information necessary for providing one or more checkout interfaces that provide automatic account creation and passwordless account use.

Merchant device 120 includes at least one communication module 128 adapted to communicate with communication device 110 and/or service provider server 130. In various embodiments, communication module 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 130 may be maintained, for example, by a transaction processing service provider, which may include payment processing providers and other type of financial service providers, as well as account services including passwordless account setup. In this regard, service provider server 130 includes one or more processing applications which may be configured to interact with communication device 110, merchant device 120, and/or another device/server to facilitate account setup and transaction processing for financial transactions, as well as account and digital wallet use and maintenance. In one example, service provider server 130 may be provided by PAYPAL®, Inc. of San Jose, Calif., USA. However, in other embodiments, service provider server 130 may be maintained by or include another account provider entity and/or financial entity.

Service provider server 130 of FIG. 1 includes a transaction processing application 140, a passwordless token application 132, other applications 134, a database 136, and a network interface component 138. Passwordless token application 132, transaction processing application 140, and other applications 134 may correspond to executable processes, procedures, and/or applications with associated hardware. In other embodiments, service provider server 130 may include additional or different modules having specialized hardware and/or software as required.

Transaction processing application 140 may correspond to one or more processes to execute modules and associated specialized hardware of service provider server 130 to receive and/or transmit information from communication device 110 for establishing payment accounts, as well as processing and completing of one or more transactions initiated by the user and using the payment account for transaction processing, for example, through use of a digital wallet associated with the payment account having one or more stored payment instruments. In this regard, transaction processing application 140 may correspond to specialized hardware and/or software to establish payment accounts and associated digital wallets, which may be utilized to send and receive payments and monetary transfers and engage in other financial transactions. The user associated with communication device 110 may establish a payment account with transaction processing application 140 by providing personal and/or financial information to service provider server 130 and selecting an account login, password, and other security information. In various embodiments, the financial information may include payment instrument information, such as account numbers. The user may directly provide the required account information, for example, during an account setup process. However, in other embodiments, the information may be received from a guest checkout process where the user does not actively establish the account, and instead requests guest checkout. In such embodiments, the user may not provide a username, password, or other account credentials. Thus, transaction processing application 140 may automatically generate the account for the user based on the received information. A username may be automatically generated, and may be generated using the user name, such as a real first/last name, email address, etc. Additionally, transaction processing application 140 may create a randomly generated password or assign the password as null. Transaction processing application 140 may then use the account for transaction processing. Passwordless token application 132 may be used to provide a token to one or more devices utilizing the account for expedited future authentication.

The payment account may be used to send and receive payments. The payment account may be accessed and/or used through a browser application and/or dedicated payment application executed by communication device 110. Transaction processing application 140 may receive a payment request from communication device 110 and/or merchant device 120 for a transaction between the user and the merchant, which may include identifiers, tokens, or other data used for transaction processing. Transaction processing application 140 may provide payment to the merchant using the payment instrument, and may provide a transaction history to communication device 110, merchant device 150, or store the history with one or more accounts. Thus, the account may be used as a payment instrument by service provider server 130 for transaction processing.

Passwordless token application 132 may correspond to one or more processes to execute modules and associated specialized hardware of service provider server 130 to generate a token or cookie that allows expedited authentication for a payment account of a user by providing the token or cookie to transaction processing application 140 during transaction processing between the user and a merchant. In this regard, passwordless token application 132 may correspond to specialized hardware and/or software to receive a guest checkout request and an automatically generated account by transaction processing application 140. The automatically generated account may include account credentials, such as an automatically generated username, password, and/or PIN. Passwordless token application 132 may utilize the account credentials to generate a token or cookie with communication device 110, where the token includes encrypted information sufficient to authenticate the user for use of the automatically generated payment account. The token may be stored to communication device 110. The token or cookie may be limited in use by requiring an authentication credential known to the user, such as a PIN or biometric (e.g., fingerprint) during checkout for a transaction using the account for transaction processing. Additionally, where a device requests guest checkout for an already created payment account of the user, for example, if the user uses a new device, passwordless token application 132 may compare received user and/or financial information to stored information for the account and authenticate the user. Passwordless token application 132 may then generate a new token or cookie, refresh a previous token/cookie for use, and communicate the new or refreshed token/cookie to communication device 110.

In various embodiments, service provider server 130 includes other applications 134 as may be desired in particular embodiments to provide features to service provider server 130. For example, other applications 134 may include security applications for implementing server-side security features, programmatic client applications for interfacing with appropriate application programming interfaces (APIs) over network 150, or other types of applications. Other applications 134 may contain software programs, executable by a processor, including a graphical user interface (GUI), configured to provide an interface to the user when accessing service provider server 130. In various embodiments where not provided by transaction processing application 140, other applications 134 may include connection and/or communication applications.

Additionally, service provider server 130 includes database 136. As previously discussed, one or more of a user and a seller may establish a payment account including a digital wallet with service provider server 130. Accounts in database 136 may include entity information, such as name, address, birthdate, payment/funding information, additional user financial information, and/or other desired user data. An entity may link to their respective accounts through an account, user, merchant, and/or device ID, as well as a generated token/cookie, which may be provided to communication device 110 and/or merchant device 120 for use. Thus, when a token or cookie is transmitted to service provider server 130, e.g., from communication device 110, an account belonging to the entity may be found.

In various embodiments, service provider server 130 includes at least one network interface component 138 adapted to communicate communication device 110 and/or merchant device 120 over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

FIG. 2A are exemplary interfaces of a checkout process to establish a passwordless account and use the account during checkout, according to an embodiment. Environment 200a of FIG. 2A includes exemplary screenshots displayed during establishment of an account based on received user information, without requiring a user to enter an account establishment process. In this regard, environment 200a displays a process for passwordless onboarding of member accounts by not requiring authentication credentials, such as a password, to be entered by a user. Instead, the account may be automatically established based on the received information, where the password is automatically generated or entered as null during account establishment.

In this regard, a checkout interface 1000 includes multiple fields 1002 for entry of user information by a user, which may include required financial information for transaction processing, such as credit card or debit card information entered into one or more of fields 1002. Fields 1002 further include data entry elements (e.g., text entry boxes, menus, or selectable options) to enter personal user information and/or user contact information, including a phone number and/or email address. Checkout interface 1000 having fields 1002 may be displayed through a merchant website or dedicated application after the user engages in a transaction with the merchant and requests a checkout process to perform transaction processing of the transaction.

In response to entering of user information to fields 1002, the user may be displayed a new user checkout 1004. New user checkout 1004 may be displayed in response to determining that the user does not have an account with the service provider performing the transaction processing for the checkout process, for example, by finding no entries for the user information for the user. The user may be provided a passwordless authentication prompt 1006 that notifies the user that the user does not have an account with the service provider, and that the user may save their information with the service provider for future processing, including creating an account with an automatically generated or null entered password, and storing data to the user's device to allow for recall of the account and authentication of the device for use of the account. The user may be provided an opt-in field 1008 having a selectable option to opt-in to storing the user information and generating the account, which may be processed using navigation buttons 1010. For example, after the user performs the user opt-in 1012 by selecting opt-in request 1014, navigation buttons 1016 may be updated from navigation buttons 1010 to request user agreement to user opt-in 1012 and allow for account creation. The account may be generated automatically without the user entering a password or establishing authentication credentials, and data may be stored to the user's device that is used for passwordless authentication during future transaction processing sessions on the device. Thus, to authenticate the user for use of the account, a secure token or encrypted cookie may be utilized on the device to provide secure account credentials and authenticate the user.

Figure 2B:
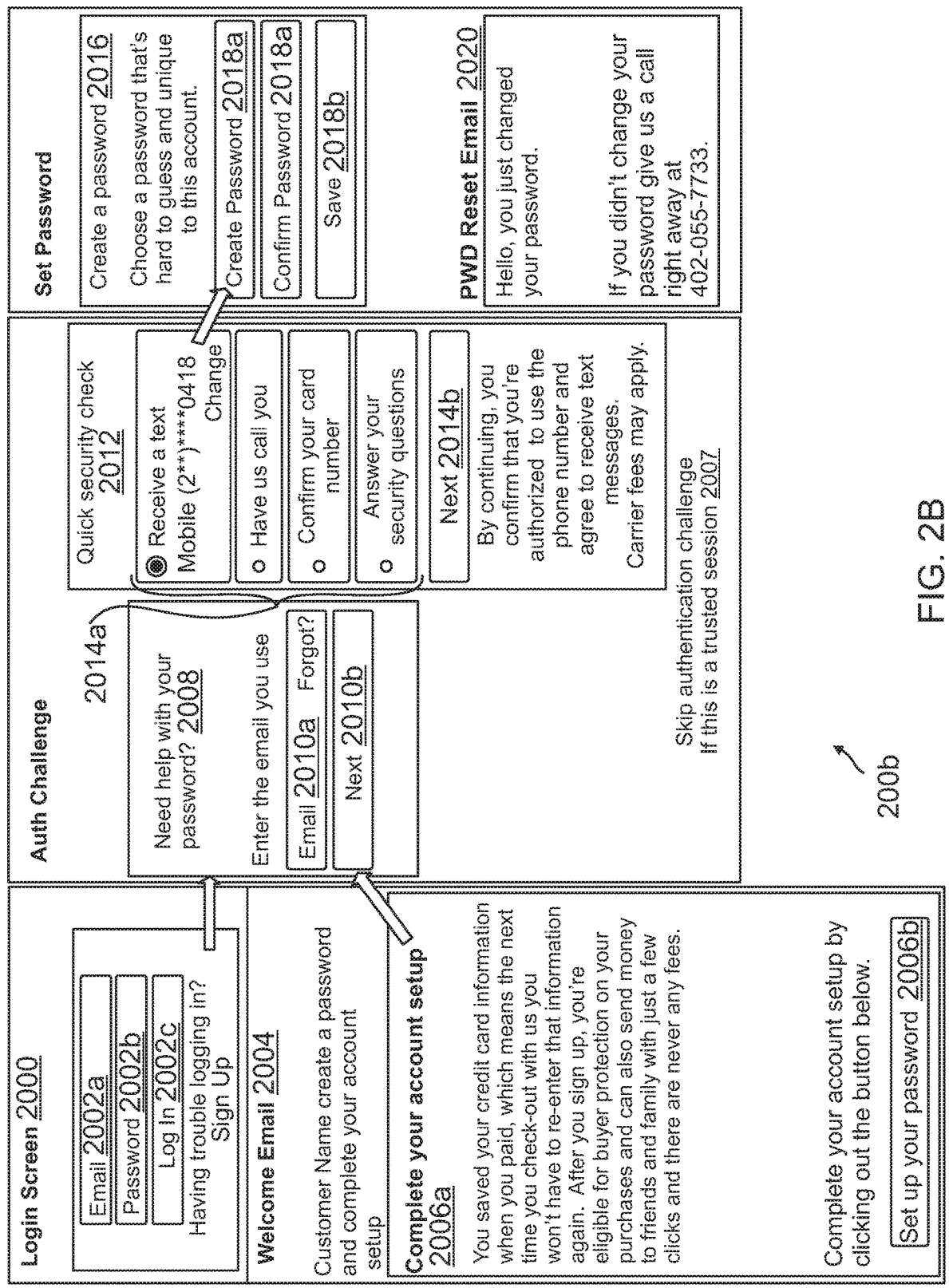
FIG. 2B are exemplary interfaces of a process to establish a password for an account previously using passwordless account authentication, according to an embodiment.

FIG. 2B are exemplary interfaces of a process to establish a password for an account previously using passwordless account authentication, according to an embodiment. Environment 200b of FIG. 2B includes exemplary screenshots displayed during account access and/or password reset or creation for a previously generated account having passwordless authentication through a device token/cookie. In this regard, environment 200b displays a process for establishment of a password for an account of the user, and accessing the account using the password so that the account can further be accessed using an entered password instead of passwordless authentication through the device side token/cookie transmitted to the service provider.

A user may view one or more of login screen 2000 and welcome email 2004 that allows the user to access authentication challenge interface 2008 and then a set password interface 2016 after answering an authentication check request 2012. In this regard, login screen 2000 may include email field 2002a for entry of an email used to establish the account, a password field 2002b to access the account, and select a login field 2002c. Since the user does not know the password, as the password was automatically generated during account establishment (e.g., through a randomized password or null password), the user may instead select another link to enter authentication challenge interface 2008. Thus, the user may enter an email to email field 2002a or may enter no information and instead request assistance with login to access authentication challenge interface 2008. For welcome email 2004, the user may view an account setup request 2006a, and select a link 2006b to arrive at authentication challenge interface 2008 for establishment of authentication credentials for the account.

Authentication challenge interface 2008 may include a user email field 2010a to enter the user email address used during account setup, which may correspond to the user email account receiving welcome email 2004. If the user enters the user email, the user may select a navigation button 2010b to view an interface having authentication check request 2012. Authentication check request 2012 may include one or more options 2014a for authentication of the user, for example, by performing an authentication check through a phone number, payment instrument information, and/or security questions. Once the user has completed authentication check request 2012, the user may select navigation button 2014b to advance to a set password interface 2016. In certain embodiments, authentication challenge interface 2008 and/or authentication check request 2012 may be skipped, for example, if a trusted session or secure communication channel 2007 is established between the user's device requesting the account setup and the service provider server.

At set password interface 2016, the user may view new password fields 2018a to enter a password that the user sets and therefore knows. The new password may therefore update the automatically entered password for the account so that the account may also or instead be accessed using the new password instead of using passwordless authentication through a device side token/cookie that is used to authenticate the device for use of the account. The user may then select a save option 2018b to set the password. In response to the new password, the user may also view a reset email 2020 to confirm the account setting changes and further assure against fraud.

Figure 3:
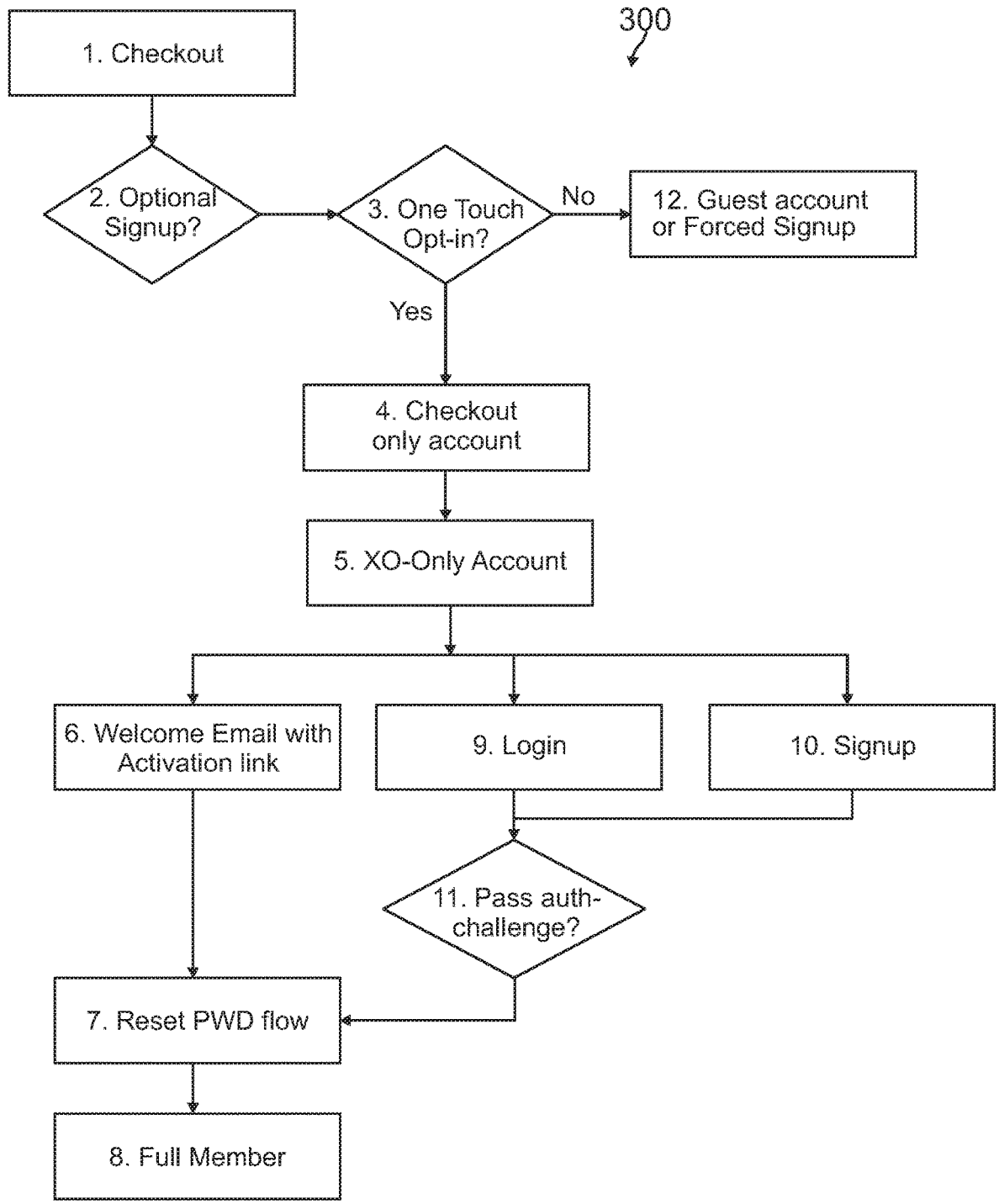
FIG. 3 is an exemplary process flowchart for creating passwordless account authentication and one touch checkout processes with passwordless account authentication, according to an embodiment.

FIG. 3 is an exemplary process flowchart 300 for creating passwordless account authentication and one touch checkout processes with passwordless account authentication, according to an embodiment. Note that one or more steps, processes, and methods described herein may be omitted, performed in a different sequence, or combined as desired or appropriate.

Flowchart 300 may begin with a user entering a checkout process at step 1, the checkout process may be entered from a merchant website or application, and display a checkout interface that requests user information. The checkout interface may be provided by a service provider for a checkout process, where the checkout process establishes a communication channel for transmission of information between the service provider and the user's device securely. The use may be provided with an option for an optional signup of a one-touch account access and passwordless authentication at step 2, where the user may select to opt-in to one touch account access and passwordless authentication at step 3. However, if the user does not wish to perform the one-touch account access and passwordless authentication, the user may either select to enter a forced signup that requires the user to establish an account and authentication credentials or to perform the guest checkout that does not create an account having passwordless authentication, at step 12.

If the user wishes to generate a checkout only account that uses passwordless authentication, the user may opt in at step 5, and a checkout only account using passwordless authentication may be generated by the service provider using the user information from the checkout interface displayed in step 1. The account may be generated using the user information, where authentication credentials are automatically entered without user input. The account may further be identified and device use authenticated through storing device side data to the user's device. The checkout only account may be used for future transaction processing through the use of a device token or cookie stored to the device communicating with the service provider during steps 1-5, and the account may be automatically used by the device through providing the token/cookie during future checkouts to authenticate the device for use of the account. Additionally, a welcome email may be sent at step 6, which may provide a password reset flow to establish a password and allow for general account usage, including accessing the account, through establishment of the password by the user so that the password is known to the use, at step 7. At step 8, the user may become a full member for the account with the service provider. The user may also enter the password reset flow at step 9 through a login request by the user, or at step 10 through a signup request. Once entered and the password set for the account, the user may require a password authentication challenge, at step 11, before the password reset flow can be completed, at step 7, where the user again becomes a full member, at step 8.

Figure 4:
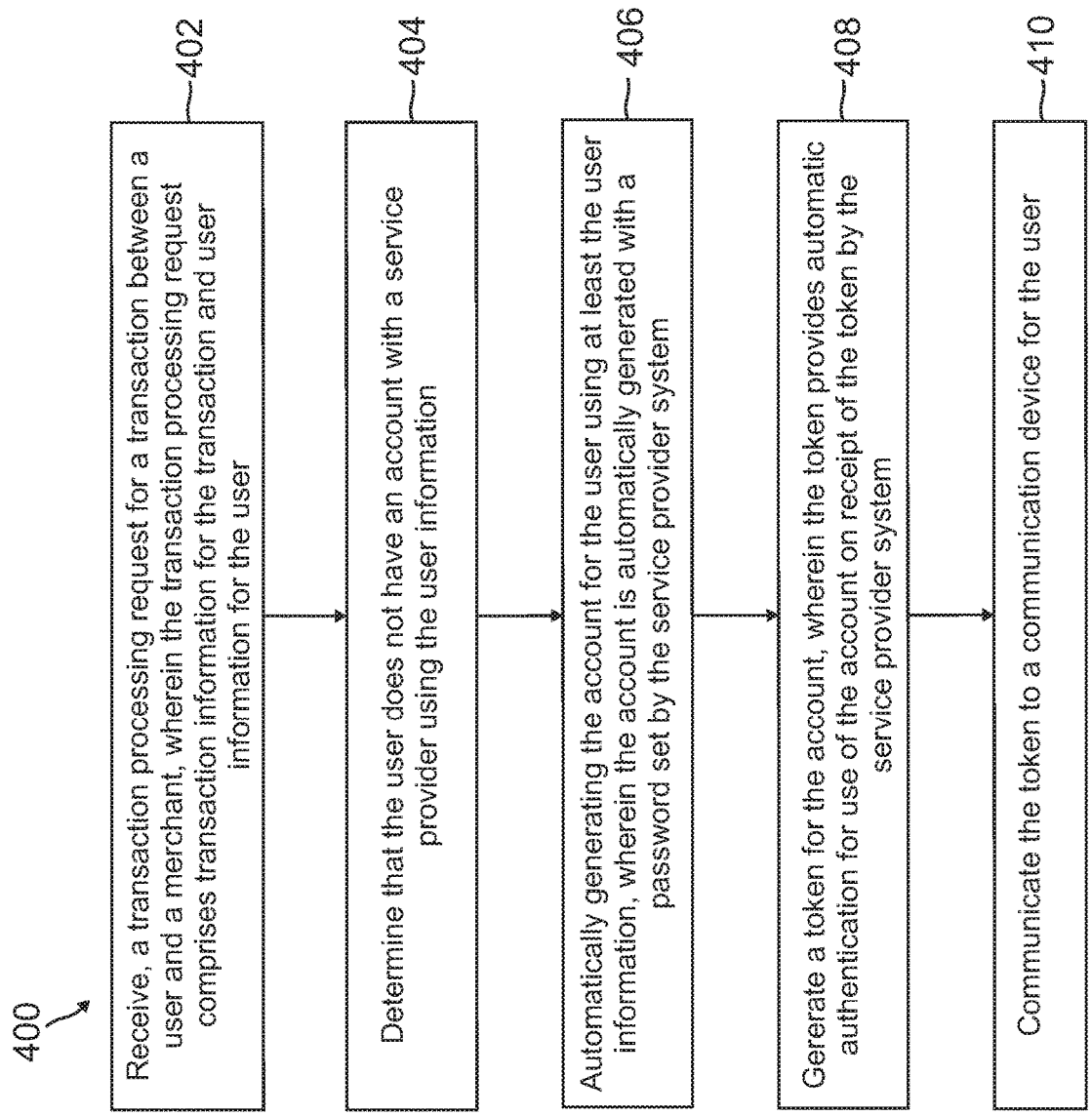
FIG. 4 is an exemplary process flowchart for passwordless authentication through use of device tokens or web browser cookies, according to an embodiment.

FIG. 4 is an exemplary process flowchart 400 for passwordless authentication through use of device tokens or web browser cookies, according to an embodiment. Note that one or more steps, processes, and methods described herein may be omitted, performed in a different sequence, or combined as desired or appropriate.

At step 402, a transaction processing request for a transaction between a user and a merchant, wherein the transaction processing request comprises transaction information for the transaction and user information for the user. The transaction processing request may be received from one of a merchant device for the merchant in the transaction and the communication device for the user in the transaction, and the transaction processing request may be received during a guest checkout process for transaction processing of the transaction without having previously established the account for the user with the service provider system. The transaction processing request may be received from a secure communication channel between the service provider system and the communication device generated during a checkout process entered by the communication device. Thus the transaction processing request may be entered to a checkout interface displayed through a merchant website or dedicated application of the merchant, wherein the checkout interface comprises at least one field for entry of the user information, and wherein the checkout interface is provided by the service provider system to the merchant website or the dedicated application.

At step 404, it is determined that the user does not have an account with the service provider using the user information. The account for the user is automatically generated using at least the user information, wherein the account is automatically generated with a password set by the service provider system, at step 406. The password may be one of a randomly generated password or a null password having the password set to null. A token for the account is generated, at step 408, wherein the token provides automatic authentication for use of the account on receipt of the token by the service provider server. At step 410, the token is communicated to a communication device for the user. The token may be transmitted to the device of the user using a secure communication channel between the service provider and the device. The token may correspond to a device side data element, which may include one of an encrypted device side token that provides authentication credentials for the account or an HTTP cookie corresponding to the establishing the account during a previous session with the service provider.

Additional steps may include receiving a new transaction processing request from a different device for the user, wherein the new transaction processing request comprises at least a portion of the user information for the user, and identifying the account of the user using at least the portion of the user information. Additionally, the user may be authenticated using at least the portion of the user information and a new token may be communicated to the different device of the user. Moreover, the transaction may be processed using the transaction information and the account of the user.

In various embodiments, a password reset request from the user may be received from the user. Thus, at least a portion of the user information may be requested from the user, and the user may be authenticated for the account using the at least the portion. In response, a password establishment interface may be provided to the user, wherein the password establishment interface comprises a process to enter a new password set by the user for the account. The password establishment interface may be provided through an email communicated to an email account of the user from the user information. A new password may then be received from the user and the new password may be established for the account to authenticate use of the account. Account access and services for the account associated with establishing the new password may be provided. In order to provide the password establishment interface, an email may be sent to an email address of the user from the user information, wherein the email comprises a password establishment process to set a new authentication password for the account by the user. The email may be transmitted in response to one of a request by the user to establish the new authentication password during the future transaction processing or during a password recovery process with the service provider. The email may also comprise an alert of a transaction processing request using the account or the user information with a new device different from the device.

Figure 5:
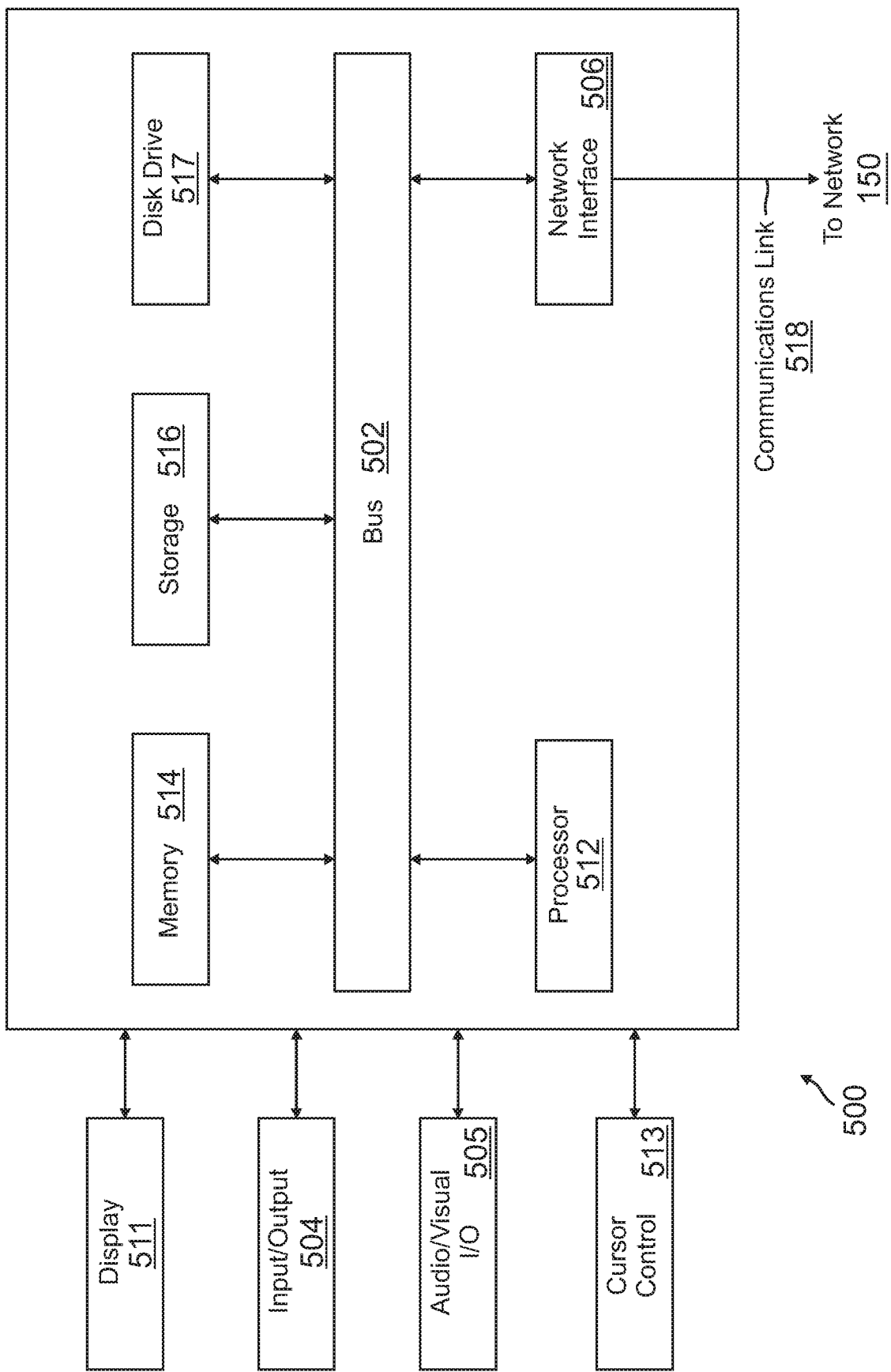
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
  receiving, by a service provider server, a first transaction processing request for a transaction between a user and a merchant, wherein the first transaction processing request comprises transaction information for the transaction and user information for the user;
  establishing, by the service provider server, a secure communication channel with a first communication device of the user;
  determining, by the service provider server using the user information, that the user does not have an account with the service provider server;
  automatically generating, by the service provider server, the account for the user using at least the user information, wherein the account is automatically generated to be accessible via a password;
  receiving, by the service provider server, first device information for the first communication device of the user via the secure communication channel;
  generating, by the service provider server, a first hash value of the first device information using a hashing function;
  generating, by the service provider server using at least the first hash value, a first token for authentication by the service provider server of the account;
  communicating, by the service provider server, the first token to the first communication device of the user through the secure communication channel;
  providing, by the service provider server on a plurality of merchant websites, a checkout process that automatically authenticates the first communication device using the first token;
  requesting, by the service provider server, the first token from the first communication device via the checkout process on one of the plurality of merchant websites;
  automatically receiving, by the service provider server without user input from the first communication device, the first token via the checkout process from the one of the plurality of merchant websites;
  authenticating, by the service provider server, the first communication device for the account with the checkout process on the one of the plurality of merchant websites;
  receiving, by the service provider server from a second communication device different from the first communication device, a second transaction processing request comprising the user information for the user and second device information for the second communication device, wherein the second transaction processing request is received without the first token from the checkout process;
  determining, by the service provider server, the account using the user information;
  requesting, by the service provider server, user identification information for the user based on the receiving the second transaction processing request without the first token;
  receiving, by the service provider server, the user identification information from the second communication device with the second transaction processing request; and
  issuing, by the service provider server, a second token to the second communication device based on a second hash value of the second device information using the hashing function.

2. The method of claim 1, wherein the first transaction processing request is received from one of a merchant device for the merchant in the transaction or the first communication device for the user in the transaction, and wherein the first transaction processing request is received during a guest checkout for transaction processing of the transaction without having previously established the account for the user.

3. The method of claim 1, wherein the password is one of a randomly generated password or a null password having the password set to null.

4. The method of claim 1, wherein the first transaction processing request is received during the checkout process for the transaction between the user and the merchant.

5. The method of claim 1, wherein the first transaction processing request is entered to a checkout interface of the merchant, wherein the checkout interface comprises at least one field for entry of the user information.

6. The method of claim 1, further comprising:
receiving, by the service provider server, a password reset request from the user;
requesting, by the service provider server, at least a portion of the user information from the user;
authenticating, by the service provider server, the user for the account using the at least the portion; and
providing, by the service provider server, a password establishment interface to the user, wherein the password establishment interface comprises a process to enter a new password set by the user for the account.

7. The method of claim 6, wherein the password establishment interface is provided through an email communicated to an email account of the user from the user information.

8. The method of claim 6, further comprising:
receiving, by the service provider server, the new password from the user;
establishing, by the service provider server, the new password for the account to authenticate a use of the account; and
providing, by the service provider server, account access and services for the account associated with establishing the new password.

9. The method of claim 1, further comprising: processing, by the service provider server, the transaction using the transaction information and the account of the user.

10. A system comprising:
a non-transitory memory; and
one or more hardware processors coupled to the non-transitory memory and configured to read instructions from the non-transitory memory to cause the one or more hardware processors to perform operations comprising:
receiving a first transaction processing request for a transaction between a user and a merchant from a first communication device of the user, wherein the first transaction processing request comprises transaction information for the transaction and user information for the user;
determining, using the user information, that the user does not have an account with a service provider;
automatically generating the account for the user using at least the user information, wherein the account is automatically generated to be accessible via a password;
receiving first device information for the first communication device of the user via a secure communication channel;
generating a first hash value of the first device information using a hashing function;
generating, using at least the first hash value, a first token for authentication by the service provider of the account;
communicating the first token to the first communication device of the user through the secure communication channel;
providing, on a plurality of merchant websites, a checkout process that automatically authenticates the first communication device using the first token;
requesting the first token from the first communication device via the checkout process on one of the plurality of merchant websites;
automatically receiving, without user input from the first communication device, the first token via the checkout process from the one of the plurality of merchant websites;
authenticating the first communication device for the account with the checkout process on the one of the plurality of merchant websites;
receiving, from a second communication device different from the first communication device, a second transaction processing request comprising the user information for the user and second device information for the second communication device, wherein the second transaction processing request is received without the first token from the checkout process;
determining the account using the user information;
requesting user identification information for the user based on the receiving the second transaction processing request without the first token;
receiving the user identification information from the second communication device with the second transaction processing request; and
issuing a second token to the second communication device based on a second hash value of the second device information using the hashing function.

11. The system of claim 10, wherein the password comprises one of a null password or a random password for the account.

12. The system of claim 10, wherein the secure communication channel comprises an encrypted communication channel with the first communication device.

13. The system of claim 10, wherein the first token is at least one of a device-specific token for only the first communication device or a browser-specific token for a web browser on the first communication device.

14. The system of claim 10, wherein the operations further comprise:
receiving an opt-in acceptance for a passwordless authentication of the account from the first communication device.

15. The system of claim 10, wherein the first token is associated with a biometric of the user for access to the first token.

16. The method of claim 1, wherein the automatically receiving, the first token from the first communication device during the checkout process is based on a one-touch checkout opt-in by the first communication device.

17. A non-transitory machine-readable medium having stored thereon machine-readable instructions executable by at least one hardware processor to cause the at least one hardware processor to perform operations comprising:
receiving a first transaction processing request for a transaction between a user and a merchant from a first communication device of the user, wherein the first transaction processing request comprises transaction information for the transaction and user information for the user;
determining, using the user information, that the user does not have an account with a service provider;
automatically generating the account for the user using at least the user information, wherein the account is automatically generated to be accessible via a password;

receiving first device information for the first communication device of the user via a secure communication channel;

generating a first hash value of the first device information using a hashing function;

generating, using at least the first hash value, a first token for authentication by the service provider of the account;

communicating the first token to the first communication device of the user through the secure communication channel;

providing, on a plurality of merchant websites, a checkout process that automatically authenticates the first communication device using the first token;

requesting the first token from the first communication device via the checkout process on one of the plurality of merchant websites;

automatically receiving, without user input from the first communication device, the first token via the checkout process from the one of the plurality of merchant websites;

authenticating the first communication device for the account with the checkout process on the one of the plurality of merchant websites;

receiving, from a second communication device different from the first communication device, a second transaction processing request comprising the user information for the user and second device information for the second communication device, wherein the second transaction processing request is received without the first token from the checkout process;

determining the account using the user information;

requesting user identification information for the user based on the receiving the second transaction processing request without the first token;

receiving the user identification information from the second communication device with the second transaction processing request; and issuing a second token to the second communication device based on a second hash value of the second device information using the hashing function.

18. The non-transitory machine-readable medium of claim 17, wherein the first transaction processing request is received from one of a merchant device for the merchant in the transaction or the first communication device for the user in the transaction, and wherein the first transaction processing request is received during a guest checkout for transaction processing of the transaction without having previously established the account for the user.

19. The non-transitory machine-readable medium of claim 17, wherein the password is one of a randomly generated password or a null password having the password set to null.

20. The non-transitory machine-readable medium of claim 17, wherein the first transaction processing request is received during the checkout process for the transaction between the user and the merchant.

* * * * *